March 23, 1937.                W. C. HUGULEY                2,074,694
                        MACHINE FOR MAKING MATCH BOOKS
                        Filed Aug. 23, 1934         10 Sheets-Sheet 1
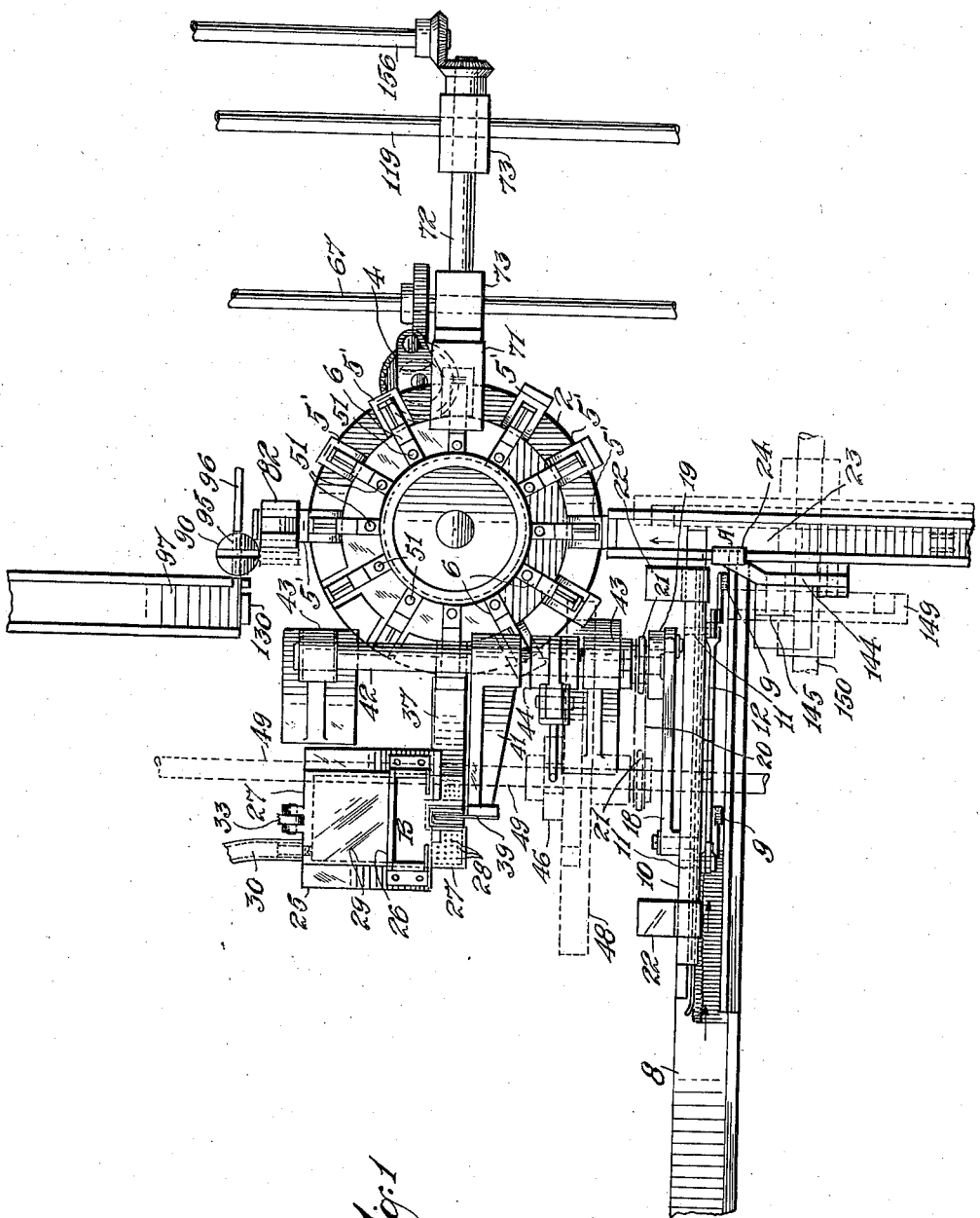
INVENTOR
William C. Huguley
BY
Fred O. Fischer
ATTORNEY March 23, 1937.  W. C. HUGULEY  2,074,694
MACHINE FOR MAKING MATCH BOOKS
Filed Aug. 23, 1934    10 Sheets-Sheet 2
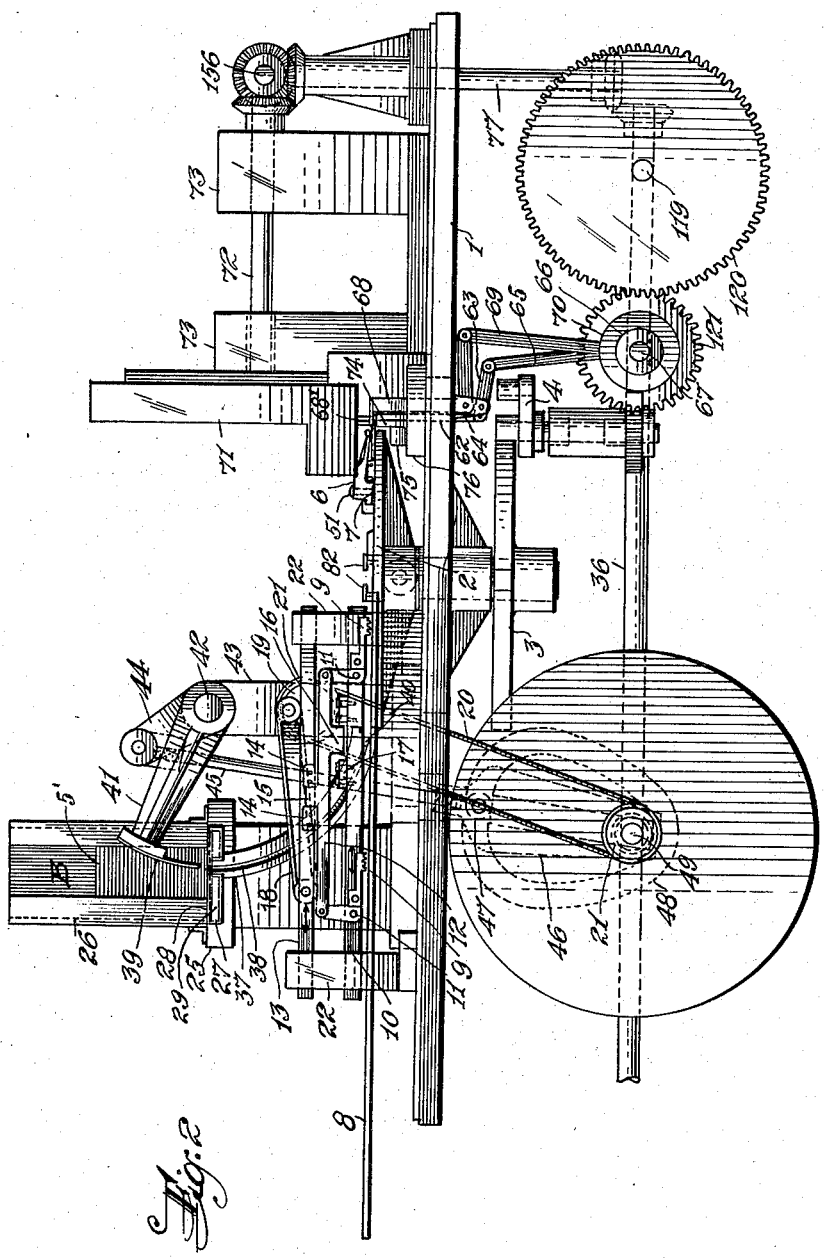
INVENTOR
William C. Huguley
BY
ATTORNEY

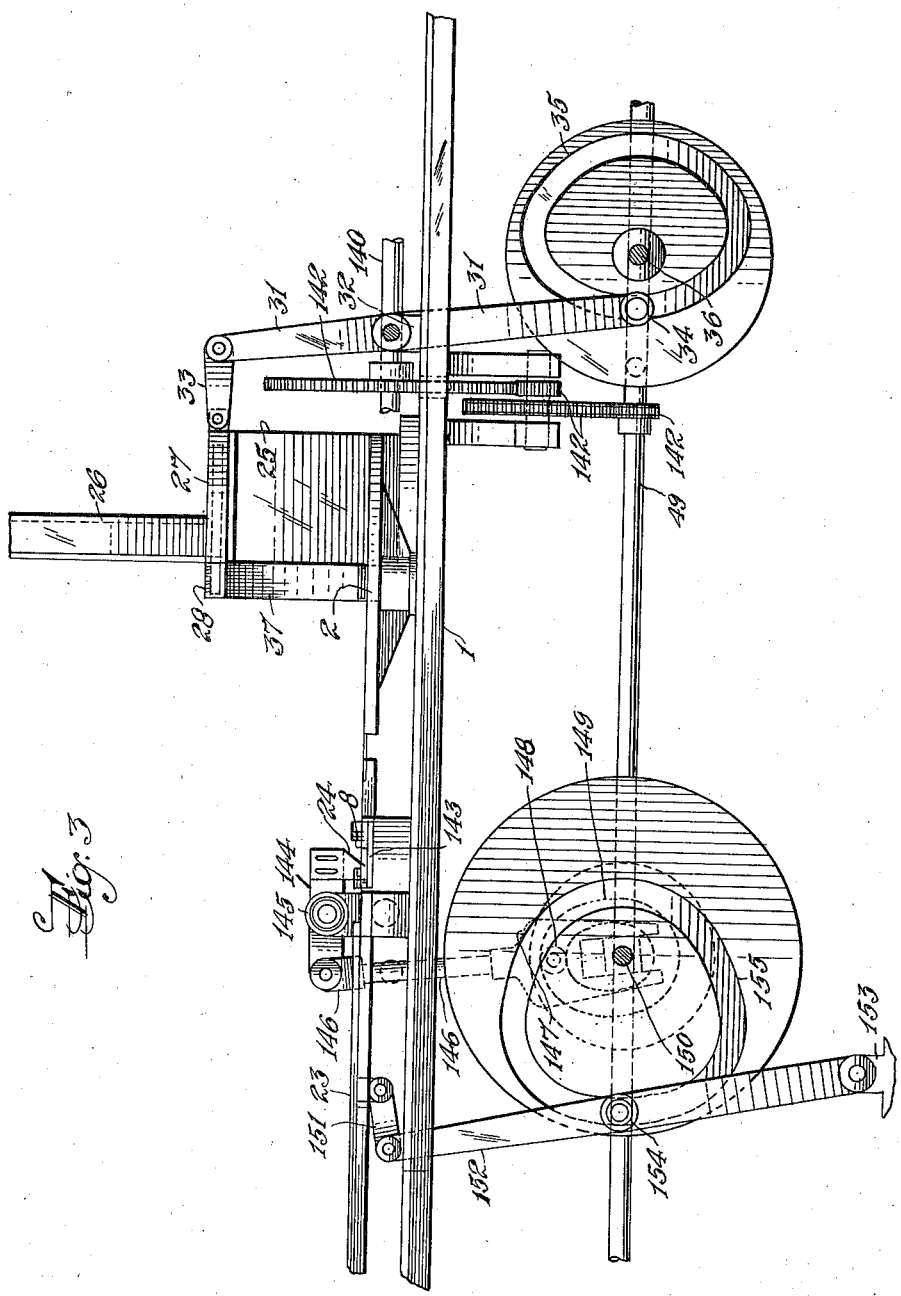

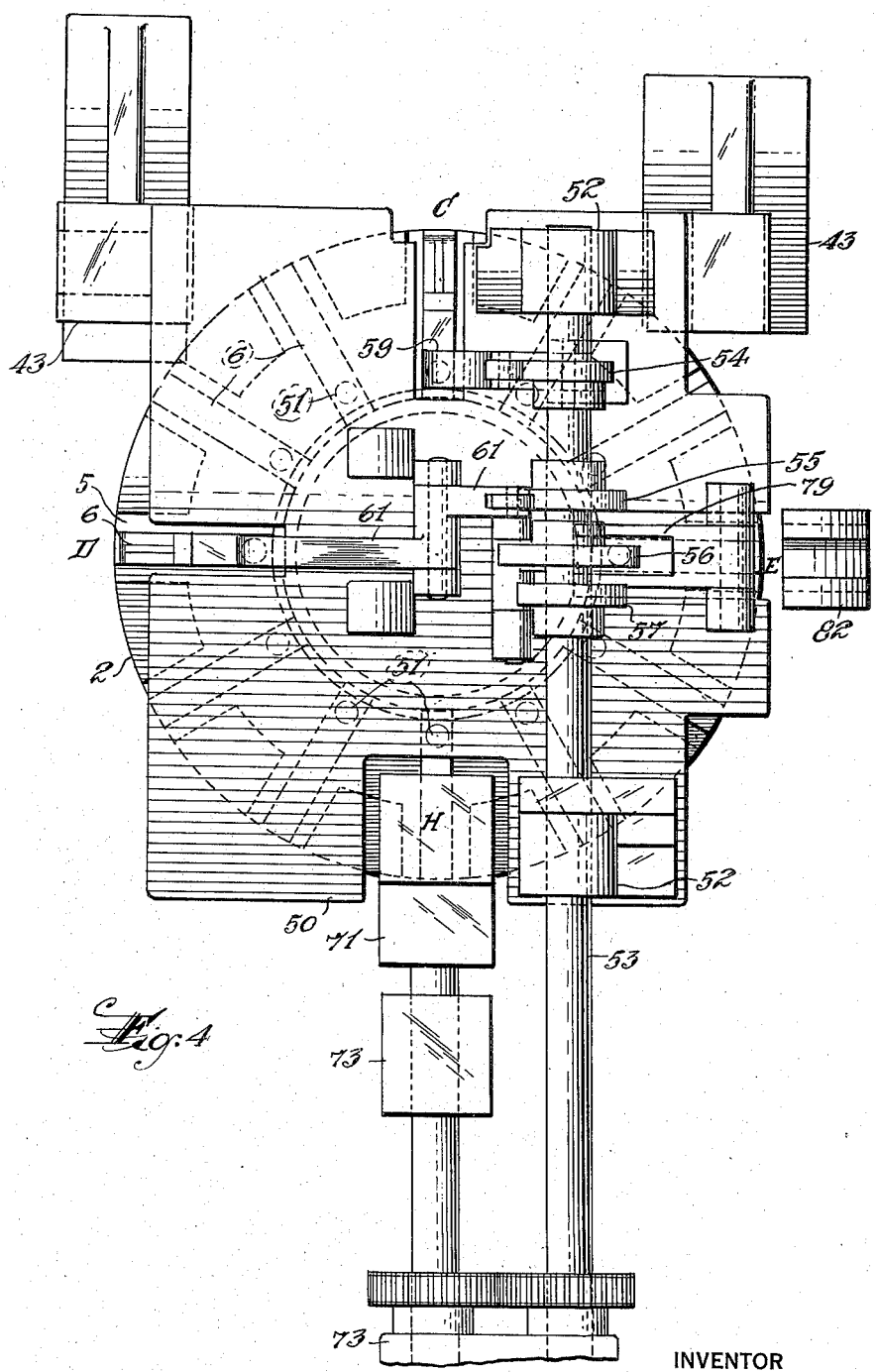

March 23, 1937.  W. C. HUGULEY  2,074,694
MACHINE FOR MAKING MATCH BOOKS
Filed Aug. 23, 1934     10 Sheets-Sheet 5
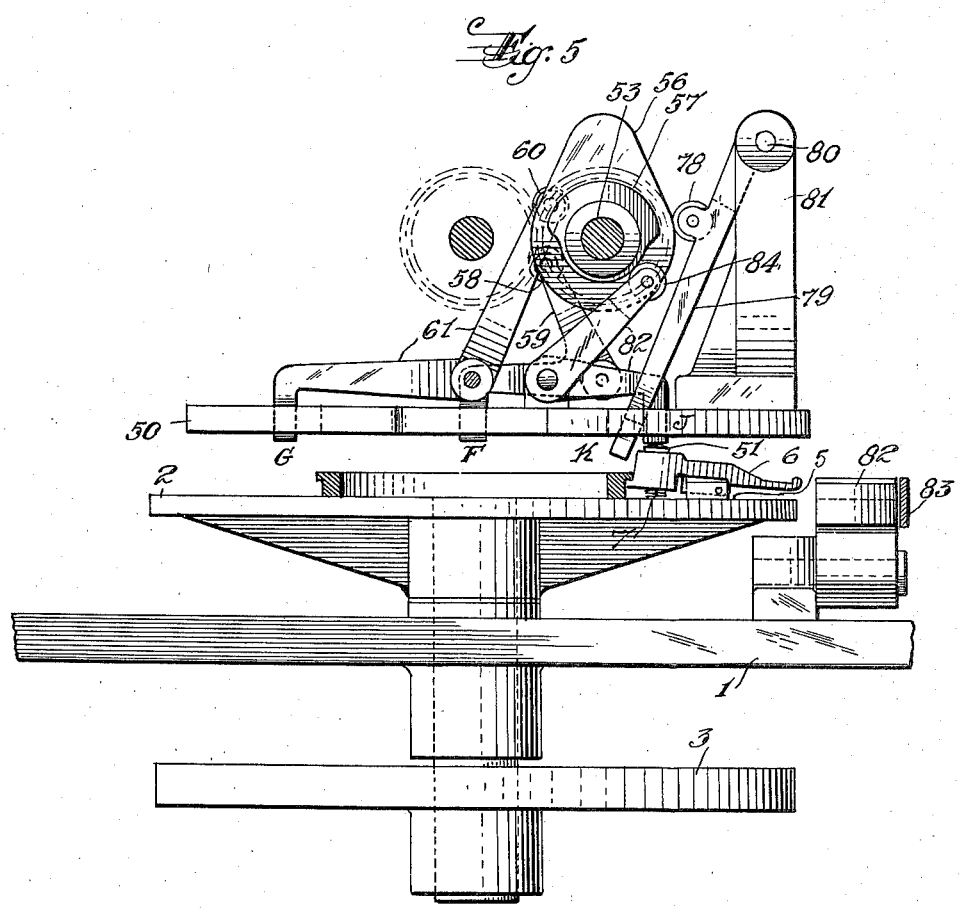
INVENTOR
William C. Huguley
BY
Fred C. Fischer
ATTORNEY

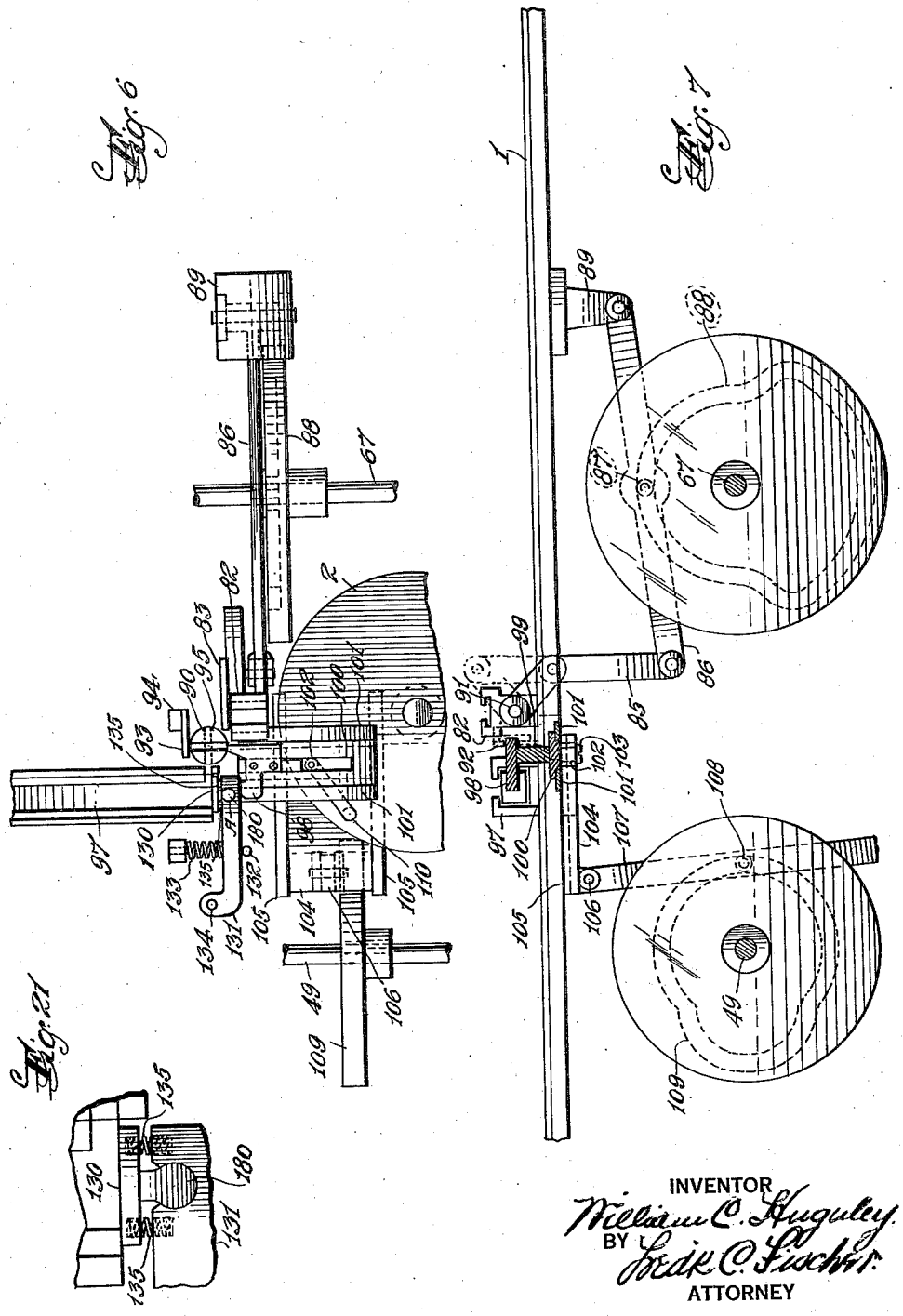

March 23, 1937. W. C. HUGULEY 2,074,694
MACHINE FOR MAKING MATCH BOOKS
Filed Aug. 23, 1934 10 Sheets-Sheet 7
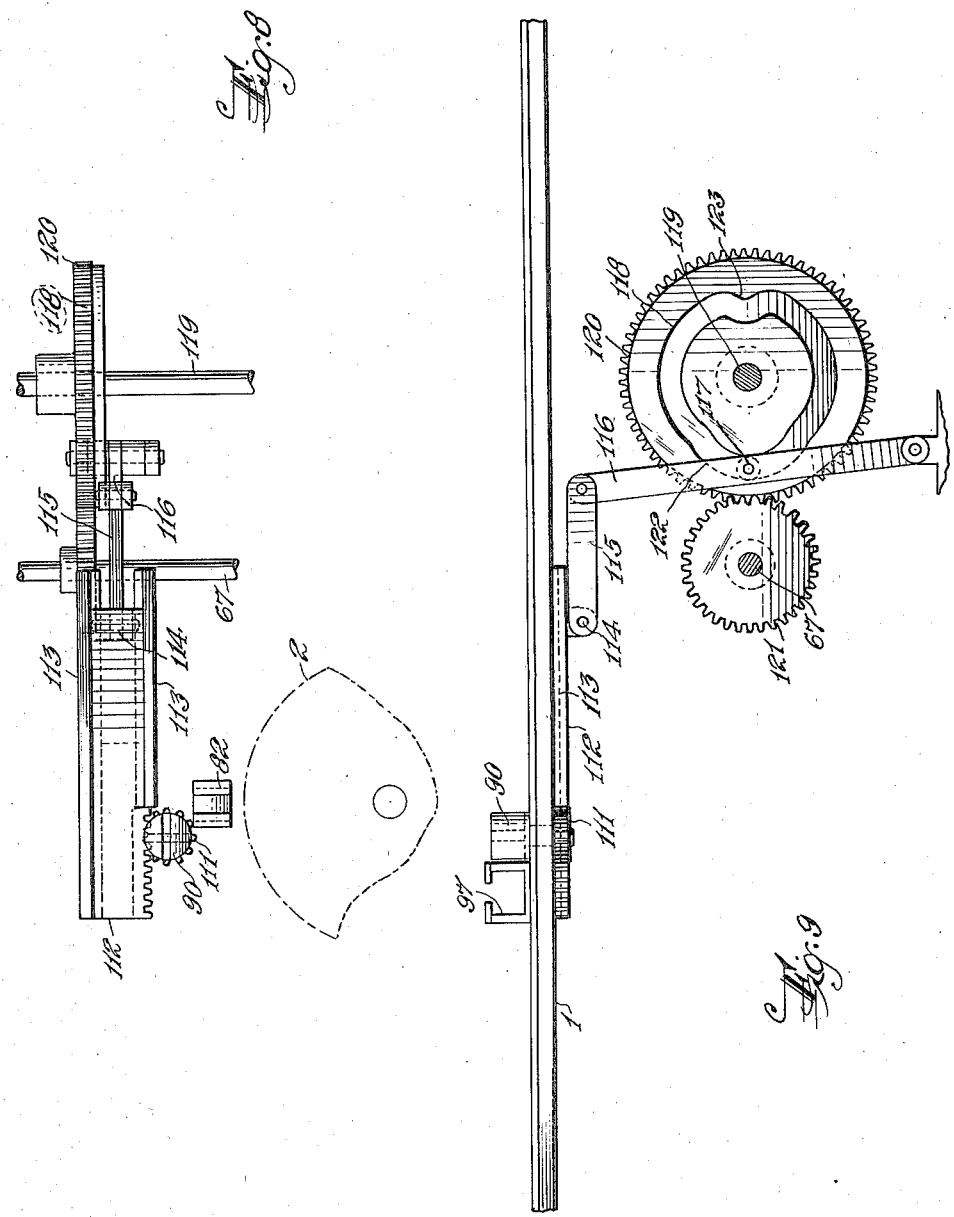
INVENTOR
William C. Huguley
BY
Frank O. Fischer
ATTORNEY

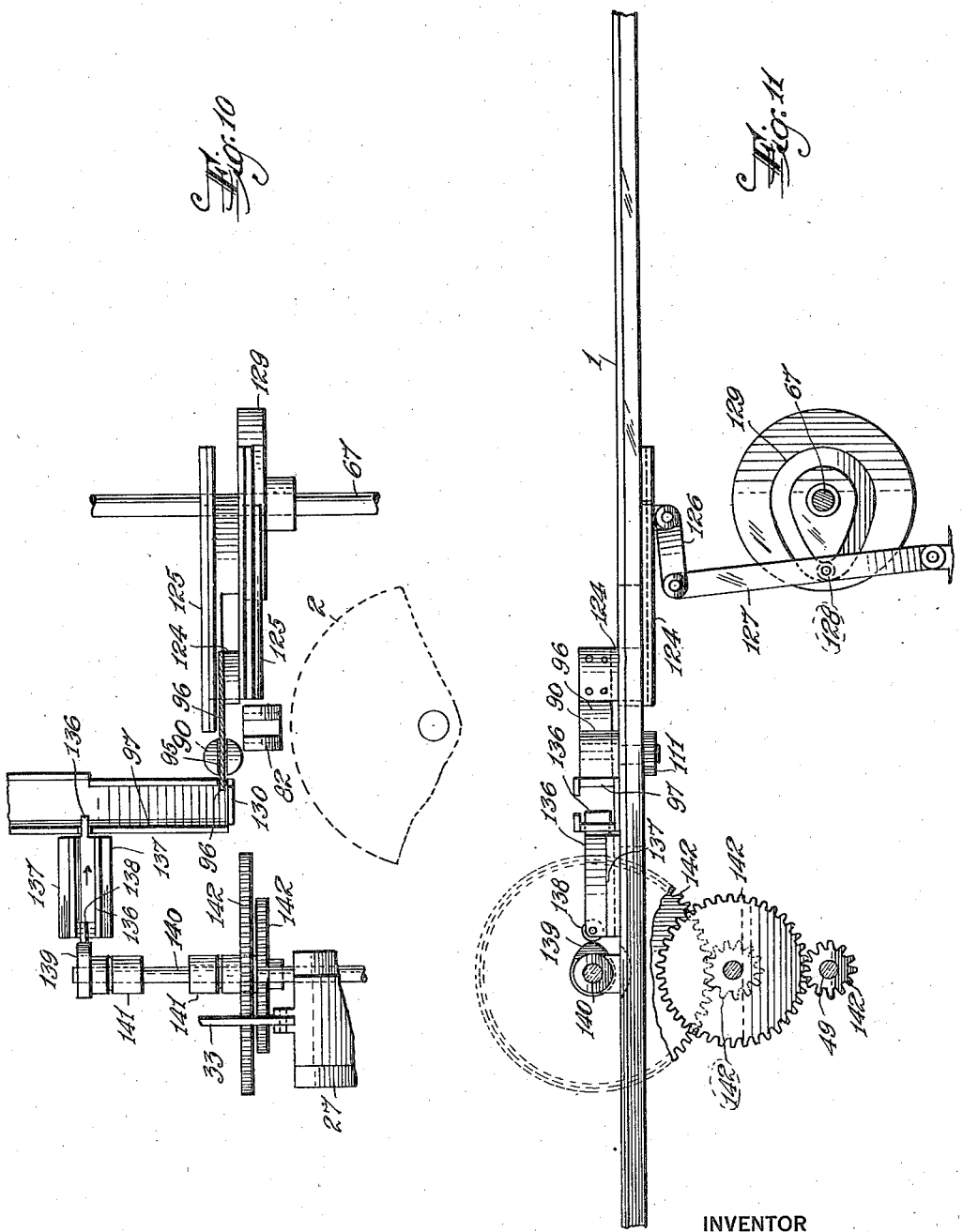

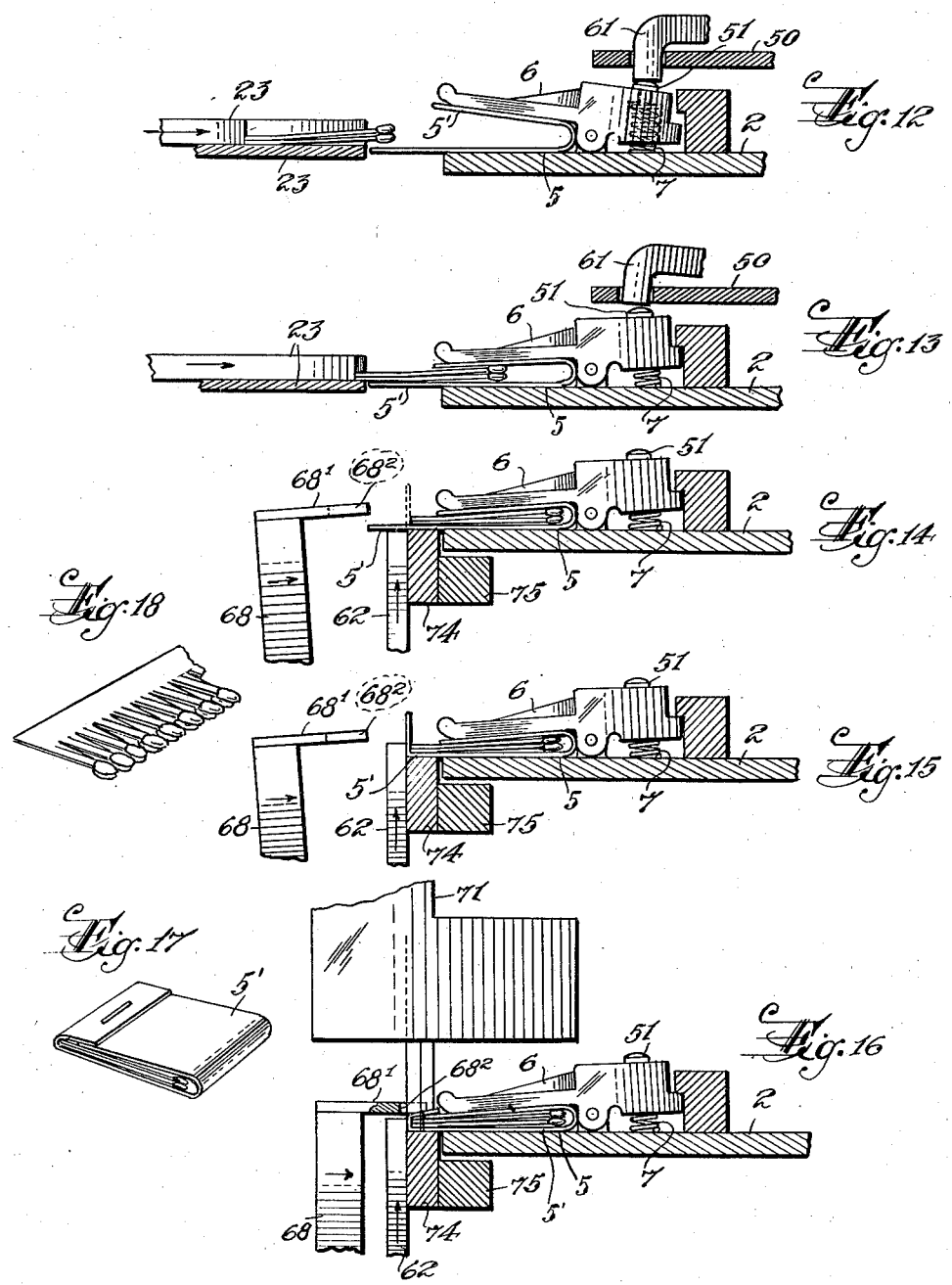

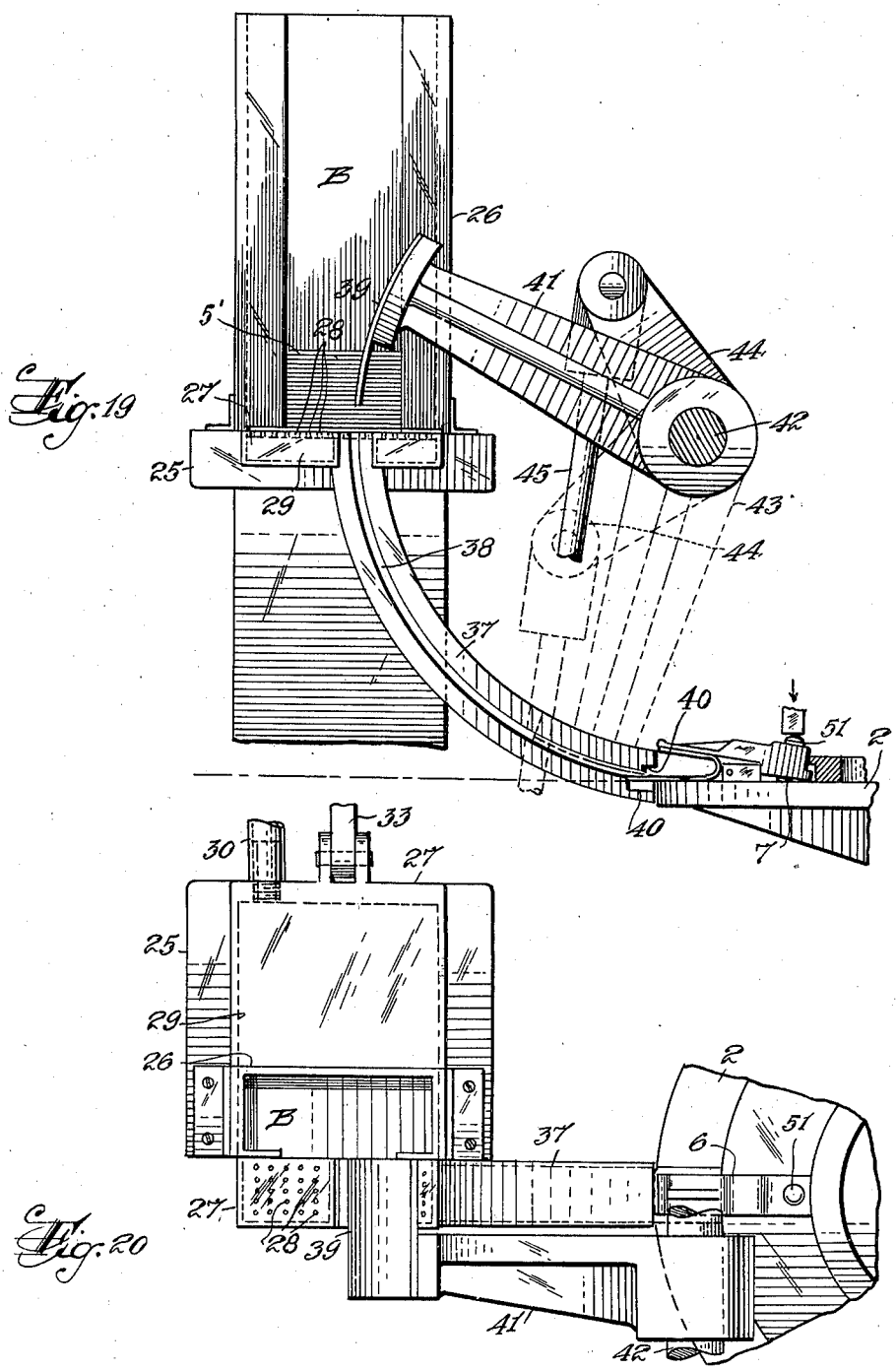

Patented Mar. 23, 1937

2,074,694

UNITED STATES PATENT OFFICE 2,074,694

MACHINE FOR MAKING MATCH BOOKS

William C. Huguley, Oak Tree, N. J., assignor of one-fourth to E. F. Baerenrodt, Essex Falls, N. J.

Application August 23, 1934, Serial No. 741,057

8 Claims. (Cl. 93—7)

The present invention relates to a match-book machine of the type which is designed to automatically place matches in a cover strip and to stitch or otherwise secure the matches within the cover strip.

Match books, of the type referred to, commonly consist of a section of matches fastened into a cover strip, the cover strip being folded about the matches to constitute an enclosure. The matches are secured in place within the cover by means of a single wire stitch or staple passing through the base of the match portion and piercing the cover strip to thus hold the parts of the book together. The matches employed in these match books as supplied to the trade are made of a specially prepared cardboard, cut into thin strips to constitute the individual matches.

The section of cardboard from which the matches are made is usually not cut throughout its entire width when the individual matches are formed, but has an uncut portion at the base of the matches of sufficient width to receive the wire stitch which secures the matches and the cover strip together. By this means the matches are all supported from the uncut portion and to remove a match it is merely necessary to tear it from this uncut portion of the cardboard strip.

One or more sections of matches are incorporated into a single book as desired. The outer ends of the strips of cardboard constituting the individual matches are dipped and are thus coated with a compound suitable for constituting the match head. As supplied by the manufacturer the matches are in strips of considerable length and this strip is, during the making of the match book, divided in sections of width corresponding to the width required in each book.

It is the principal object of this invention to provide a match book machine which is adapted to receive a strip of matches of width sufficient to form a plurality of match books and which is adapted to divide the match strip into a plurality of sections and simultaneously perform upon all the sections the operations necessary to the formation of a complete match book. The cover strips are supplied to the apparatus in the form of single covers, having been previously prepared with the desired printing and striking surface as desired. The operation of the apparatus is entirely automatic and requires no attention whatsoever other than to supply the machine from time to time with a quantity of cover strips and to periodically start the match strips into the feeding mechanism in the desired multiples.

It is a particular object of the invention to divide the match strips supplied to the machine into a plurality of sections and then, by mechanism which is entirely automatic in its operation, place the several match sections within the respective cover strips, each match section being properly located centrally of its enclosing strip.

It is a further object of the invention to provide an apparatus of this type in which the various steps necessary to the production of the finished article are performed simultaneously on different articles in successive stages of progress through the apparatus and in which the mechanisms performing the various steps of the operations are operated in synchronism from a common power source. Thus at every cycle of operation of the apparatus not only is a single operation performed on several articles simultaneously, but all of the various operations necessary to the completion of the finished article are performed simultaneously on different articles in successive stages of progress through the apparatus. At every cycle of operation of the apparatus a completed match book is discharged from the machine.

It is a further object of the invention to provide in an apparatus of the class described, certain novel features of structure and design whereby book matches and similarly shaped articles are assembled side by side with the corresponding ends of the contiguous articles in opposite relation to each other. In the machine match books, wedge-like or tapering in form (owing to the match heads of the covered cards or splints) are discharged from an intermittently rotating table one at a time, with the thinner end of the book rearward. The said positioning or stacking member is mounted and operated by the same common source of power in such relation to the intermittently rotating table as to receive the match books as rapidly as they are thus discharged and positions them for delivery with their smaller or thinner ends alternately reversed.

It is a further object of the invention to provide a simple and efficient construction and arrangement of mechanism whereby the articles discharged from the positioning member are directly deposited side by side in a receptacle and therein assembled in a column, said receptacle being of such character that predetermined quantities of the articles can be readily removed therefrom for convenience of packing by hand.

Another object of the invention is the provision of mechanism whereby the efficient operation of the positioning, assembling and counting mechanism in harmony with the operation of the book match machine is accomplished.

The principal object of my present invention is to provide a match book assembling, stacking and counting machine which is an outstanding improvement over present methods. The principal objects are to do away with the common method of using a chain conveyor or linked belt which is subject to stretching and thereby causing a defective product and also to have the books of matches delivered from the machine in a stacked and counted formation, thereby, doing away with the costly operation of hand sorting, stacking and counting which is common to the trade.

With the above and other objects in view, reference is had to the accompanying drawings, in which:

Fig. 1 is a plan view of the machine,
Fig. 2 is an elevational view showing working parts,
Fig. 3 is an elevational view showing working parts,
Fig. 4 is a plan view of pressure finger operating mechanism and match book ejecting mechanism,
Fig. 5 is an elevational view of Fig. 4,
Fig. 6 is a plan view of the transfer device,
Fig. 7 is an elevational view of Fig. 6,
Fig. 8 is a plan view of the rotating device,
Fig. 9 is an elevational view of Fig. 8,
Fig. 10 is a plan view of the ejector for rotating device and of the counting mechanism,
Fig. 11 is an elevational view of Fig. 10,
Fig. 12 is a view showing the cover as it is opened to receive the match cards,
Fig. 13 is a view showing the pressure finger applying pressure on match cards before they are pushed all the way in, in order to check their travel at the end of a stroke and give the accurate positioning of match cards,
Fig. 14 is a view showing match cards inserted all the way in with backs of match cards accurately positioned ready for back or short fold,
Fig. 15 is a view showing the first operation of back fold on cover,
Fig. 16 is a view showing the finish fold of the back fold and stapling,
Fig. 17 is a view of the finished product,
Fig. 18 is a view of match strips as they are introduced to the machine in any desired length,
Fig. 19 is a fragmentary view of a portion of Fig. 2,
Fig. 20 is a fragmentary view of a portion of Fig. 1,
Fig. 21 is a fragmentary view of a portion of Fig. 6.

Referring to Fig. 2, 1 represents the top of frame work or support upon which the operating mechanism of the apparatus is mounted. The matches as presented to the machine are of the usual type employed in match folders or books of the kind produced by the machine of this application. They are presented in the form of strips, each strip being several times as wide as the width of the group of matches incorporated in a single folder so that each strip of matches supplied to the machine will ultimately be divided into a number of portions and incorporated into as many covers. The strips here shown in Fig. 18 are intended to be divided into ten different sections so that for each strip of matches introduced, ten complete folders or books will be formed.

The apparatus is provided with an intermittently rotating table 2 which is operated by means of a Geneva wheel 3, (see Fig. 2) and Geneva arm 4. The rotating table 2 has mounted upon its surface a number of receiving pockets 5 and also a corresponding number of pressure fingers 6 which receive their pressure from a coil spring 7 (see Fig. 12) mounted under one end of pressure finger 6.

A match strip receiving table 8 is provided at the front of the machine upon which an operator places two strips of matches together (one on top of the other) and pushes them into a slot in the direction of the arrow (Fig. 1) until the end of the strip has butted against the end of the preceding match strips that are being automatically fed by means of feeding fingers 9. When the feeding finger 9 has engaged the end of the match strips that the operator is feeding then the operator is free to pick up two more match strips preparatory to placing them on table 8 as the feeding finger then takes care of the feeding as soon as it has engaged the end. Feed fingers 9 are provided with teeth on their lower surface to fit in between the match splints so as to give a positive grip. These feed fingers 9 are operated back and forth and are mounted on a sliding bar 10 by means of studs 11 (see Fig. 2) upon which the fingers 9 are free to pivot a controlled amount which allows the teeth on the lower surface to be lifted out of and clear of the match strips before starting to return for another grip, and also allows them to set down on the matches before starting its forward feeding stroke. The two feeding fingers 9 are connected by means of a link 12 which is pushed back and forth by a sliding bar 13 mounted over and above sliding bar 10. Sliding bar 13 has two driving dogs 14 mounted upon its surface that engage a driving lug 15 which extends from the top side of a feed finger connecting link 12. It will be seen that as sliding bar 13 moves back and forth it in turn causes connecting link 12 to move back and forth a like amount. When the link 12 is pushed to the right or forward it in turn causes the feed finger 9 to lower and when it is pushed back or to the left it causes them to raise. Extending from the lower or under side of connecting link 12 there is another projecting driving lug 16 which engages a pair of adjustable stops 17 that are mounted on the upper surface of sliding bar 10. By means of adjustable stops 17 on the bar 10 that carries feed fingers 9 a definite stopping and starting position of feed fingers 9 is accomplished. The space or lost motion provided by these stops 17 permit the fingers 9 to raise and lower before moving forward or backward as lug 16 must engage stop 17 before bar 10 will advance. Sliding bar 13 is connected by means of a link 18 to a crank 19 which is driven by a chain 20 and sprockets 21. It will be seen that sliding bar 13 is provided with a constant reciprocating action by means of this link and crank action, and in turn imparts a constant reciprocating action to link 12 through dogs 14 and lug 15, but bar 10 is allowed to dwell at each end of the stroke to allow time for fingers 9 to raise and lower by means of lost motion provided by adjustable stops 17. The sliding bars 10 and 13 are mounted in brackets 22. When feed fingers 9 have fed the end of match strips out and into the path of travel of transfer slide at A to a definite position, a cut-off knife 24 descends and severs the proper amount from the match strip and the severed piece is allowed to rest in the transfer slide channel at A (Fig. 1) preparatory to being transferred forward and into a match cover that is in the pocket 5 of table 2. Simultaneous with this match card feed and cutting operation, a cover is fed, folded and placed in the receiving pocket 5 on table 2. The knife 24 is preferably actuated by the mechanism shown in Fig. 3 and hereinafter more particularly described.

Referring to station B (Figs. 1, 2, 19 and 20), on table 1 at the left side toward the rear thereof is a bracket 25 upon which is supported a hopper or magazine 26 containing a stack of flat cover blanks 5' with the striking material already applied. Mounted in a horizontal guideway in bracket 25 and directly beneath the hopper 26 is a slide 27 which constitutes the bottom of the hopper. The portion of the slide beneath the hopper is provided in its upper surface with a series of vertical perforations 28, which communicate with a chamber 29 within the slide. This chamber is connected at one end with a flexible tube 30 in communication with a suitable exhaust fan or vacuum pump, whereby air is exhausted from the chamber, and the lowermost blank in the hopper is thus held flat and in position by suction upon the perforated portion of the slide. Hence by reciprocating the slide to move its perforated portion under and beyond the hopper, the lowermost blanks are successively removed from the hopper. Any appropriate mechanism may be employed for actuating the slide. In the present instance a vertical lever 31 (Fig. 3) is fulcrumed to depending bracket 32 on the table, the upper or shorter arm being pivotally connected with the slide by link 33 and the longer arm of the lever being provided with a trunnion roller 34 in engagement with the grooved periphery of cam 35. This cam is carried by a longitudinally disposed shaft 36 which is mounted in suitable bearings in the main frame and connected with other shafting by means of bevel gears and run by a common source of power.

On the front side of bracket 25 is bolted a segmental member 37 (Figs. 2, 3, 19) of a width greater than the cover blank. In this member is formed from top to bottom a curved passage 38, the outer side of which is open, and its top is below the approximate center of the blank withdrawn from the hopper by the suction slide 27. A curved blade 39 corresponding with the passage is adapted to be swung into and from the same. The blade in its downward stroke engages the opposing cover blank, and tucks it down into the passage, thereby effecting the folding of such cover blank at a predetermined spot at the approximate center of the blank and carries the blank bodily through the curved passage and sets the folded blank within one of the pockets 5 on the intermittently rotating circular table 2. To prevent the folded cover 5' from attempting to follow the return of the curved blade, two shoulders 40 are provided for at the lower end of curved passageway 38 into which the covers spring open when they have reached the end of their travel downward and enter respective pockets on the circular table. The pressure finger 6 which is at the lower end of curved passageway adjacent to the receiving pocket on the table is caused to raise while the cover is being inserted and then is lowered down on the cover previous to the table's rotation to prevent the cover from being dislodged. This mechanism is shown in Figs. 5 and 6 and will be hereinafter described.

The blade 39 is borne by an arm 41 which is mounted on a rock-shaft 42 that has its bearing brackets 43 rising from the table. On the shaft 42 is an arm 44 which is connected by a link 45 to a cam fork 46 (see Fig. 2) which is provided with a trunnion roller 47 in engagement with the grooved periphery of cam 48. This cam is carried by a transversely disposed shaft 49 which is mounted in suitable bearings in the main frame and connected by bevel gears to a common source of power, through other shafting in the machine.

It is to be noted that the construction and organization of the parts just described are such that when the folding blade 39 is in the upward position, the slide 27 is pushed forward to carry the cover blank directly under the blade. The blade then descends upon the blank. The slide remains at rest for an instant after this operation and then moves back towards the hopper 26 to receive another cover blank. When the slide is about half way back the folding blade has reached its extreme downward position. In the next or return stroke of the blade the slide continues back to its starting position under the hopper in readiness to push forward the next succeeding cover blank.

The circular table 2, previously referred to, consists of a flat circular table with a plurality of pockets 5 and spring pressure fingers 6 mounted upon its top surface at its outer rim. These pressure fingers 6 must be mechanically raised at different positions of the circular table. This mechanism is shown in Figs. 4 and 5, and is composed of a stationary platen or table 50 mounted over and above the intermittently rotating circular table 2 and supported by suitable uprights from frame table 1 on one end and resting upon shoulders provided on brackets 43 at the other end. This stationary table serves as a mounting for various brackets and bearings composing the mechanism that lifts the pressure finger and also the mechanism that ejects the finished book into the transfer and stacking mechanism.

It is necessary to raise the pressure fingers at station C (Fig. 4) to permit the folded cover being carried by curved blade 39 to enter its relative pocket upon the circular table. This is accomplished by the mechanism that is mounted upon the stationary table. On the back end and on top of each pressure finger is fixed a button 51 with a convex surface at which point the depressing levers engage it. Mounted in brackets 52 supported by table 50 is a cam shaft 53 driven from a common source of power which carries four cams 54, 55, 56, 57 for operating three pressure finger depressing levers and the finished book ejecting lever. The levers are kept in contact with the cams by means of springs (not shown).

Station C is where the folded cover is deposited in a pocket 5 on the table at which time, just previous to the cover reaching pocket, the cam 54 engaging trunnion roller 58 mounted on the lever 59 with its lower end projecting downward through table 50 to a point designated as F under which the concave button 51 will come to rest, causes lever 59 to be depressed at point F and by contact with button 51 on the pressure finger 6 causes the other end of the finger to be raised and at the same time compressing coil spring 7. When the cover has entered pocket and its ends have sprung open into shoulders 40 (Fig. 19) and the curved blade 39 has been withdrawn from the cover, then the cam 54 by its rotation allows point F of lever 59 to be raised which in turn allows coil spring 7 to expand and cause the pressure finger to lower down on the cover in the pocket, thereby holding the cover from being shifted or dislodged during movement of the circular table. This pressure finger then stays down on the cover until the table has brought it to location D (Fig. 4) at which point cam 55 through its rotation engages trunnion roller 60 mounted on lever 61 which is extended downward through table 50 to a point similar to F. When the convexed button 51 comes to rest under lever 61 at G then the cam 55, just previous to the match cards reaching the cover for insertion, pushes downward on lever 61 causing point G to press down on convexed button 51 on the pressure finger and thereby raise the outer end of the pressure finger which is holding the inserted cover blank in a folded condition in its pocket. By nature of the cover blank being folded over and not creased the cover has considerable spring to it, and when the pressure finger 6 is raised upward the cover flap naturally follows it upward and causes the cover to open up to receive the match cards that are being transferred to it. When the match cards have been inserted approximately half way into the folded cover the finger, through the rotation of cam 55 causes the lever 61 to be raised and allows the pressure finger to lower down on top of the cover flap thereby putting a downward pressure through coil spring 7, upon the match cards that are being inserted before they have been inserted all the way. This is done as a distinct improvement in book match manufacture, as heretofore the match cards were pushed by the heads which vary and cause considerable loss during manufacture due to a distorted product that was not marketable. While the transfer slide is pushing the match cards into the cover, it naturally squares up the back of the match cards due to the resistance received from the pressure finger pressing down on the cards while they are being pushed forward to their correct position. In this way, it will be seen that the backs or uncut portion of the match cards are always placed in a definite location in a cover blank, and in consequence, no variation in the back or short fold will result regardless of the variation that might occur in the heads of the matches. These operations are shown in Figs. 12, 13, 14.

The pressure finger is then allowed to remain upon the cover with its match cards inserted to hold the same by means of coil spring 7 while the circular table is being rotated intermittently to a point at H where the cover, its underside with friction or striking surface thereon projecting out beyond the circular table, is ready to be folded upward and over the back of the match cards and to be stapled. These operations are shown in Figs. 15 and 16. While the match book is dwelling at station H (Fig. 4), which is the back-folding and stitching station, the pressure finger continuing to apply its pressure upon the book, the vertical slide 62 mounted in holder 76 and pivotally connected to lever 63 fulcrumed in bracket 64 (see Fig. 2) the lever 63 being connected to link 65 which engages cam 66, is caused to be moved upward by the rotation of cam 66 mounted on transverse shaft 67. When slide 62 moves upward its upper end creates the first upward fold as in Fig. 15. In this position slide 62 is allowed to dwell while lever 68 which performs the second fold on the back is allowed to swing in and complete the fold (see Fig. 16). Lever 68 is fulcrumed in bracket 64 and is pivotally connected to link 69 which is connected to cam 70 mounted on transverse shaft 67. While lever 68 is in its forward position it is allowed to dwell there together with slide 62 causing the cover to be held in a firm position for stitching. Lever 68 with its protruding folding blade 68' mounted upon its upper end being allowed to dwell in its forward position while the stitching is being done has the center part of said folding blade cut out at $68^2$ to allow the staple to pass through it on its way into and through the book. While lever 68 is in this position the stitching mechanism 71 is operated and the book of matches is complete.

The mechanism for binding the match cards and their covers together requires no detailed illustration or description. For this purpose I employ an ordinary wire stitching machine indicated at 71, by means of which staples are formed from wire, driven through the sheets or cards from one side thereof and clinched on the reverse or under side. I provide this stitcher with a clinching anvil 74 fastened to block 75 resting upon holder 76. The stitcher 71 is fastened to bracket 73 and is driven by shaft 72 with bearings in brackets 73 and connected to a common source of power through bevel gearing and vertical shaft 77.

After the stitching operation is finished, slide 62 and lever 68 are allowed to recede from the finished book through the rotation of cams 66 and 70. The pressure finger is still holding the book in its pocket on the table, and continues to do so during the rotation of the table intermittently to position E (Fig. 4). At this position the book must be released and ejected.

When the book has reached position E, then cam 57 (Fig. 5) through its rotation and contact with trunnion roller 84 on lever 82, which projects downward through plate 50 to a point J directly over the convexed button on the pressure finger, causes the convexed button to be depressed, compressing the coil spring 7 and causing pressure finger 6 (Fig. 5) to be raised, thus releasing the finished book of matches. The pressure finger is kept up in this position by a dwell on the cam 57 while the ejecting lever 79 is allowed to eject the book. The ejecting lever 79 is pivoted at 80 in bracket 81 mounted on table 50 and carries a trunnion roller 78 which engages cam 56. After pressure finger 6 is raised then cam 56 which is rotating causes ejecting lever 79 to swing outward and end K of the ejecting lever describes an arc, and engages the book to be pushed off the circular table into transfer arm 82 which is mounted at the back of the machine and adjacent to the circular table. Mounted adjacent to the transfer arm is a stop 83 (Fig. 6) which stops the book from going through the slot in the transfer arm. Lever 79 (Fig. 5) is allowed to rest in the transfer arm 82. This is accomplished by a dwell on cam 56. Lever 79 is then allowed to return to its receded or normal position and cam 57 which is rotating allows lever 82 to raise and clear the pressure finger 6, freeing it to continue on to receive another cover at position C (Fig. 4). Lever 79 is divided at end K and the two sides pass on either side of the pressure fingers 6 thereby engaging the book at the portion that extends beyond the pressure fingers.

The finished book has now been deposited in the transfer arm 82 with its thin end or stitched end rearward. Referring to Figs. 6 and 7 in which 82 is the transfer arm in an upright position, this transfer arm is designed and operated so as to revolve on its axis 91 one quarter of a turn and this position is dotted in as 92 (Fig. 7.) It will be seen that when ejector lever 79 (Fig. 5) has pushed the finished book out of pocket on circular table into this transfer arm 82 in its upright position, then the book will be lying flat in the slot of arm 82 and then when the arm 82 revolves one quarter turn to 92, then the book will be standing on its side in the slot.

This transfer arm 82 is pivotally connected to cam operated lever 86 by means of connecting link 85. Cam lever 86 has a trunnion roller 87 which engages with the grooved periphery of cam 88 and is pivoted from bracket 89. Cam 88 is mounted on the transverse shaft 67 which is mounted in suitable bearings in the main frame work of the machine and is driven from a common source of power by means of bevel gearing.

I now have the book of matches standing on its side or edgewise ready to be transferred to the book rotator 90 which has a vertical slot in it (Fig. 6) to receive the book of matches when it is pushed out of the transfer arm 82. A stop 93 is mounted on bracket 94 which in turn is mounted on the main frame table top 1. This stop serves to check the book from going too far when being transferred to rotator 90. The purpose of this rotator is to turn the books of matches in their proper position for stacking. As the books are tapered or wedge-shaped every other book must be turned the opposite way, in order that they will stack in a straight line. This is accomplished by first turning the rotator one way and then the next book is turned the opposite way by reason of the rotator having revolved the opposite way. In other words, the rotator first rotates to the left and then to the right. At each turn of the rotator the book therein is pushed out of the slot into the receiving magazine where it is stacked. Referring to Fig. 6, 95 represents the slot in its rotated position at which time the ejector blade 96 (Fig. 1) causes the book to be ejected into magazine 97. The mechanism for blade 96 is shown in Figs. 10 and 11 and hereinafter more particularly described.

Referring to Figs. 6 and 7, 98 is the pusher that causes the book to be ejected from the transfer arm 83. This pusher 98 is fastened to a vertical projection 99 which is a part of an oscillating slide 100 which is mounted on the under side of the table top 1 and held in place by a pair of ways 101. The vertical projection 99 extends upward through a slot in table 1. The oscillating slide 100 has a cam roller 102 fastened to its under side by means of shouldered stud 103. Mounted on the under side of table 1 and oscillating at right angles to slide 100 is a slide 104 held in place by a pair of ways 105 and pivotally connected at 106 to cam lever 107 which in turn is pivoted at its lower end to a suitable bracket resting on the main bed of the machine. At its center section a cam roller 108 is mounted and engages in a grooved periphery of cam 109 which is mounted on the transverse shaft 49 of the machine. In slide 104 is a cam slot 110 which engages cam roller 102 and it will be seen that when cam 109 causes slide 104 to oscillate back and forth, the cam slot 110 being engaged with cam roller 102 will cause slide 100 to oscillate back and forth and thereby cause pusher 98 to engage the match book in the transfer arm 82 at position 92 and push the book rearward out of the transfer arm 82 and into the rotator 90.

Referring to Figs. 8 and 9, where 90 is the rotator with its vertical slot for receiving the books from the transfer arm, the under part of 90 extends downward through table 1 to the under side where a gear 111 is fastened on the lower end. This gear 111 engages with an oscillating rack 112 which is held in place on the under side of the table 1 by a pair of ways 113 and is pivotally connected at 114 with a link 115 which in turn is pivotally connected with a cam lever 116 which is pivoted to a bracket at its lower end that is fastened to the main bed plate of the machine. At about the center of cam lever 116 a cam roller 117 is mounted which engages the grooved periphery of a double-throw cam 118 which is mounted an an auxiliary shaft 119 that is driven by gear 120 at a half speed ratio from gear 121 mounted on the transverse shaft 67 of the machine. By means of gears 120 and 121 the cam 118 is caused to be run at half speed thereby permitting the use of a double-throw cam as at 122 and 123. It will be seen that when cam throw 122 is operating then the rack slide 112 will go in one direction and when the cam throw 123 is operating the rack slide will travel in the opposite direction. In this manner the rotator will first turn to the right and then it will turn to the left. The cam throws, 122 and 123 are designed with a dwell to allow the rotator 90 to stand still a sufficient length of time at the end of each rotation to allow the rotator ejector 96 to move forward through the slot in rotator and eject the book into the magazine 97.

Referring to Figs. 10 and 11 which are the rotator ejector mechanism, 96 is the ejector blade which travels through the slot in the rotator 90. This blade 96 is fastened to a vertical projection that extends upward through table 1, which projection is fixed to oscillating slide 124 which is mounted to the under side of table 1 and held in place by a pair of ways 125. This slide 124 is pivotally connected to a link 126, which in turn is connected to a cam lever 127 which is pivoted at its lower end to a suitable bracket mounted on the main bed of the machine. At about the center of cam lever 127 a cam roller 128 is mounted which runs in the grooved periphery of a cam 129 mounted on the transverse shaft 67 of the machine.

Referring to Fig. 6, when the rotator ejector blade 96 (Fig. 10) has pushed a book of matches out of the slot in the rotator into the magazine 97, then it becomes necessary to push the book rearward into the magazine to make way for the next book that is to come. This is accomplished by means of a pusher pad 130 (Fig. 6) which is pivotally connected to lever 131 which is pivoted at 134 with a stop pin 132 to control the normal position and a coil spring 133 adapted to exert a pressure against the lever 131. When the pusher 98 is moving rearward to push a book of matches out of the transfer arm 82 the same pusher contacts lever 131 and causes pusher pad 130 to also move rearward and pressing against the book that has been moved in front of it by ejector blade 96 (Fig. 10) to move rearward into the magazine, making room for the next book that is to follow. Ejector pad 130 has a coiled spring 135 under each side to enable the pad 130 to swivel at 180 thereby allowing the pad to adapt itself to the wedge-like shape of the book as it is pushing the same.

Referring to Figs. 10 and 11 showing the counting mechanism, 136 is a slide which is mounted on top of the table 1 adjacent to the magazine 97, and held in place by a pair of ways 137. One end of slide 136 is narrow and designed to push on the end of a book of matches and the other end has a cam roller 138 mounted on it which engages with the cam 139 mounted on a shaft 140, mounted in bearings of two brackets 141 which are fastened to the top of table 1 of the main framework. Shaft 140 is driven by a train of compound gearing 142, the driving gear of which is mounted on transverse shaft 49 of the machine. By means of this compound gearing 142, the ratio of which in this particular case is 1 to 25, the cam is caused to rotate one twenty-fifth as fast as the machine cycle. This cam 139 which engages cam roller 138 causes slide 136 to reciprocate back and forth and at each stroke it engages the end of one book of matches and pushes it out of line with the rest of the stack. It will be seen that as the books are advanced along the magazine 97, that every twenty-fifth book, in this case, will be projected out of line with the stack, thereby enabling the packing operator to pick up the books in units of twenty-five and to place them in containers. The magazine 97 is equipped with suitable flat spring pressure fingers (not shown) which bear down on the books of matches while they are being advanced in the magazine so as to keep the books from springing ahead or being dislodged. In this manner a uniform tension is given to the stack of books.

Referring to Fig. 3 which shows the match card cutting mechanism and transfer slide, a cut-off die 143 is mounted at the end of the table, and slot 8 is directly beneath the cut-off blade 24, which is adjustably fastened to a rocker arm 144 that is pivoted on a bracket 145, which in turn is fastened to the top side of the table 1. Rocker arm 144 is pivotally connected to link 146 which is fastened to a cam fork 147 which has a cam roller 148 mounted on it and engaging the grooved periphery of cam 149, mounted on the longitudinal shaft 150 of the machine, which shaft is mounted in suitable bearings at either end and connected by bevel gearing to the other shafts in the machine. This shaft is the main driving shaft of the machine and has a motor attached to it by means of sprockets and chain. This motor also drives the suction fan to provide the suction for the cover feeding slide 27. It will be seen that at each revolution of the cam 149, the cutter blade descends and cuts off a predetermined length of match card from the match strips that are being fed through the slot of table 8.

When this match card is cut off it comes to rest in front of the transfer slide 23 which travels through a guide that is slightly wider than the match card that has been cut off. As soon as cutter blade 24 has raised a sufficient amount so as to allow the transfer slide 23 to pass underneath it, then the transfer slide moves forward and pushes the match cards ahead of it until they have been put into the folded cover in pocket 5 on circular table 2. Transfer slide 23 is pivotally connected to a link 151 which in turn is connected to cam lever 152 that is pivotally connected at its lower end to a bracket 153 mounted on the main bed of the machine. At about the center of the cam lever 152 a cam roller 154 is mounted which engages with the grooved periphery of cam 155 that is mounted on longitudinal shaft 150 of the machine. It will be seen that for each revolution of cam 155 a pair of match cards will be placed in their respective pockets on the circular table 2.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In a machine for making match books, a rotating horizontal table, means on said table for receiving and retaining match book covers, a magazine for holding a plurality of covers in a flat condition, an arcuate chute adjacent said magazine and having an arcuate slot extending the length thereof, pneumatic means for placing a cover over one end of the chute, a member movable in said slot, said member engaging a cover intermediate the length thereof to fold the cover and move the cover through the chute into the receiving and retaining means on the table, and shoulders on the chute at the discharge end thereof to engage and prevent the cover from following said member after the cover has been deposited on the table.

2. In a machine for making match books, a rotating horizontal table, a magazine for holding a plurality of covers in a flat condition, an arcuate chute adjacent said magazine and having an arcuate slot in one of its side walls, said slot extending the length of the chute, a member movable in said slot, means for placing a cover from the magazine in a position to be engaged by said member, said member engaging the cover intermediate its length to fold the cover and move the cover through the chute on to the rotating table, and means at the discharge end of the chute to prevent the cover from following said member after the cover has been deposited on the table.

3. In a machine for making match books, a horizontal rotating table, a magazine for holding a plurality of covers in a flat condition, a chute positioned adjacent said magazine and having a slot in one of its side walls extending the length of the chute, a member movable in said slot, means for moving a cover from the magazine to a position over one end of the chute and in the path of the member, said member engaging said cover intermediate its length to fold the cover and move the cover through the chute on to the rotating table, and means at the discharge end of the chute to prevent the cover from following the member after the cover has been deposited on the table.

4. In a machine for making match books, an intermittently horizontal rotating table, means on the table for receiving and retaining match book covers, means for folding and inserting covers in the receiving and retaining means with the folded ends of the covers toward the center of the table, and means for feeding match cards having headed splints to the circular table and placing said cards in their respective covers parallel to the body portions of the covers in predetermined positions relative to the covers with the heads of the splints directed towards and spaced from the folded ends of the covers.

5. In a machine for making match books, a horizontal rotating table, means for folding match book cover blanks to extend substantially parallel to their body portions and place said folded cover blanks on the table, means on the table for retaining said blanks in a folded condition, means for feeding match cards having headed splints into the folded cover blanks on the table with the headed splints and folded ends of the cover blanks being directed towards the center of the table, and means holding said match cards in predetermined positions on the cover blanks.

6. In a machine for making match books, a rotating circular table having mounted about its outer rim a plurality of cover holding devices with pressure fingers, means for supporting match strips tangentially of the path of travel of said table, means for severing said strips into match cards of a predetermined width, means for advancing match cards to the table and within folded cover blanks held by said devices, said cards being advanced and placed into the cover blanks with the heads of the match cards foremost, and means for applying a frictional resistance to the match cards during the last part of their travel as they are entering the folded cover blanks to definitely locate the cards with reference to the cover blanks irrespective of variations in the size and shape of the match heads, thereby enabling a uniform short fold of the cover blanks.

7. In a machine for making match books, an intermittently rotated circular table, a plurality of clamping devices mounted on the table for holding folded cover blanks, means for operating said clamping devices, means for inserting cover blanks into said devices, means for actuating the circular table, and means for feeding under frictional resistance headed match cards to the circular table and feeding said cards heads foremost into cover blanks.

8. In a machine for making match books, a circular table, means for intermittently rotating the table, a plurality of clamping devices mounted on the table about the periphery thereof, means for inserting folded cover blanks into said clamping devices, and means to open and close said clamping devices at predetermined periods without releasing their hold on the cover blanks.

WILLIAM C. HUGULEY.